Aug. 30, 1938. H. C. RAFETTO 2,128,848
PROCESS FOR TREATING RAW CLAY MATERIALS
Filed Oct. 3, 1936 2 Sheets-Sheet 2
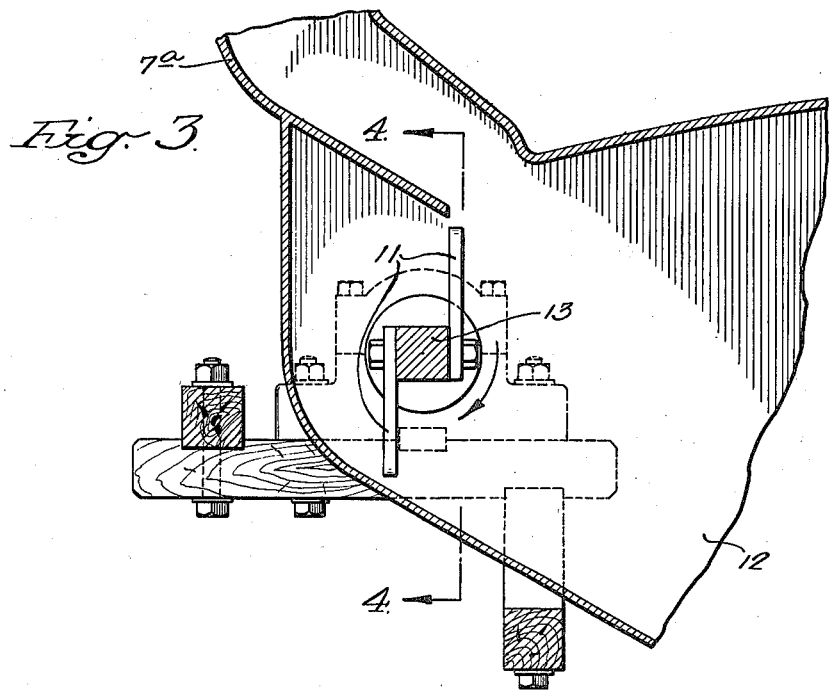
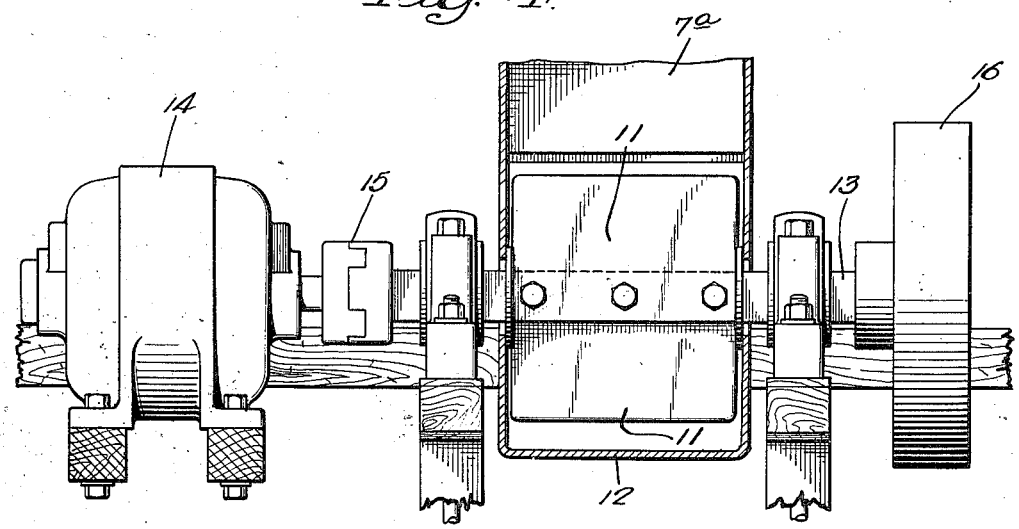
Inventor:-
Herbert C. Rafetto
by his Attorneys
Howson & Howson Patented Aug. 30, 1938

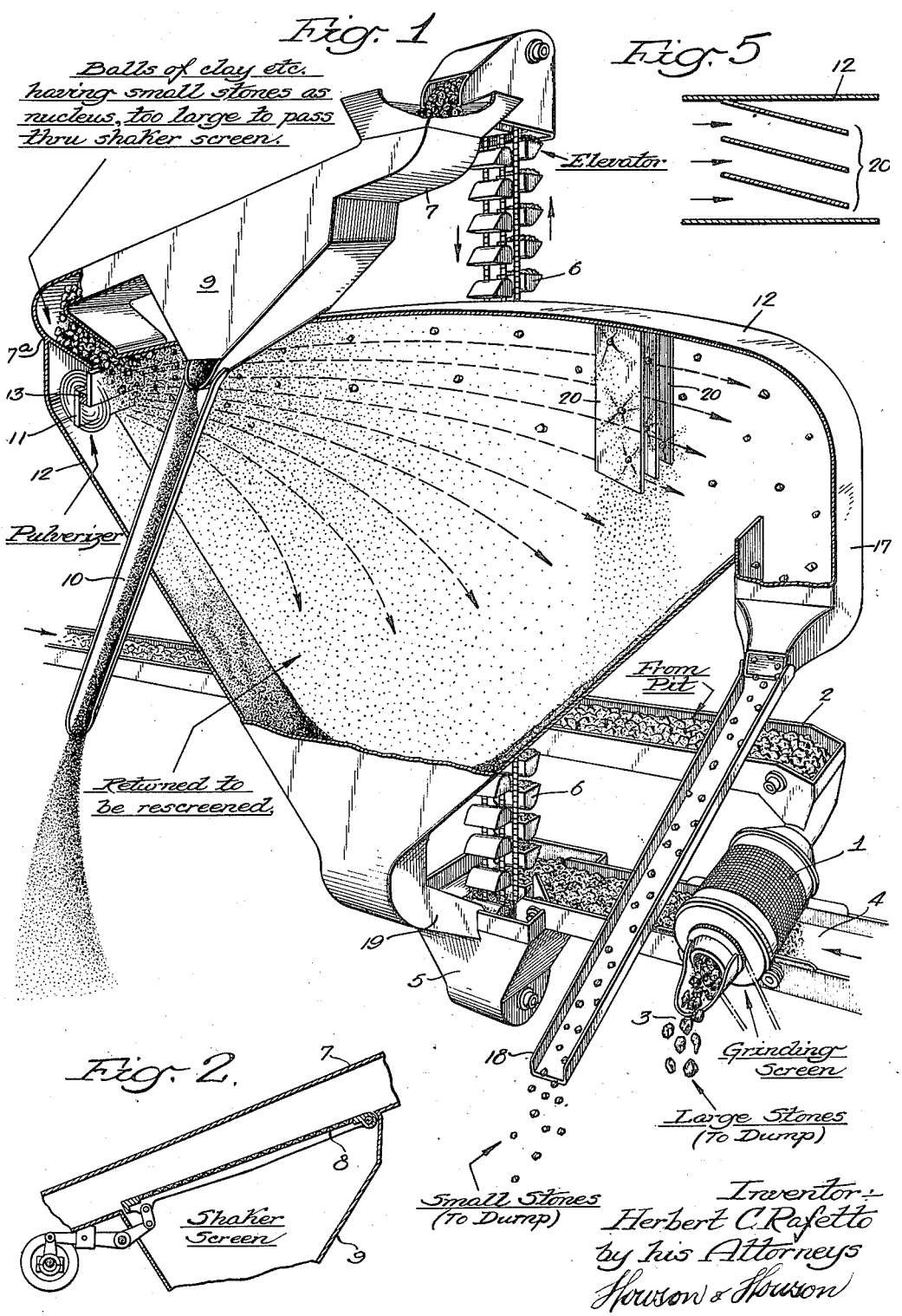

2,128,848

UNITED STATES PATENT OFFICE 2,128,848

PROCESS FOR TREATING RAW CLAY MATERIALS

Herbert C. Rafetto, Wayne, Pa.

Application October 3, 1936, Serial No. 103,933

3 Claims. (Cl. 209—6)

This invention relates primarily to improvements in the manufacture of bricks, and has to do more specifically with the preparatory treatment of the clay material of which the bricks are made.

In the manufacture of brick, it is necessary to substantially free the raw clay material from stones and other foreign solids, and to reduce the clay to a condition wherein it may be molded and compressed to brick form in a substantially uniform and homogeneous mass. While the conventional methods are reasonably effective to separate the larger stones from the clay, they are inadequate to remove the smaller stones and solid particles without a considerable loss of useful clay. This is due to the fact that the clay has a tendency to adhere to and to form balls around the smaller solid particles as a nucleus, so that if a screen is employed of sufficiently fine mesh to efficiently remove the particles themselves, they necessarily also prevent the passage of the clay balls of which these particles form the nucleus. These small particles and balls, known as "tailings", constitute a major problem in the brick industry by reason of the difficulty of reducing them to a proper state of fineness and of preventing the very substantial loss of useful clay material which they represent. In attempting to prevent this loss, it is customary to repass the "tailings" repeatedly through the reduction cycle without, however, effective reduction of any substantial part of them to the required condition.

A principal object of the present invention is to provide a process and apparatus for preparatory treatment of the clay material that will effect a substantially complete reduction of the clay component of the "tailings" and the separation of the small stones therefrom.

Another object of the invention is to provide a process of the stated character that may be conducted at relatively low expense and that will afford an end product of exceptionally good quality.

Still another object of the invention is to provide a method and apparatus that shall be capable, without expensive grinding mechanism, of separating substantially all of the solid particles and stones from raw clay, and of reducing the clay to a consistency of fine division highly adaptable for manufacture into bricks and other clay products.

In the attached drawings:

Figure 1 is a view in perspective of apparatus made in accordance with my invention;

Fig. 2 is a fragmentary sectional view illustrating a detail of the apparatus;

Fig. 3 is an enlarged fragmentary sectional view showing other details of the mechanism;

Fig. 4 is a section tn the line 4—4, Fig. 3, and

Fig. 5 is a fragmentary transverse sectional view showing a detail of the apparatus.

With reference to the drawings, the apparatus comprises a primary screen 1 of the rotary type which may take the form for example of the screen disclosed in my United States Patent No. 1,966,312, dated July 10, 1934. The function of this screen is to remove the larger stones and foreign substances from the clay and to partially reduce the clay masses to a state of sub-division. To this end, a suitable conveyer 2 is provided which is adapted to carry the raw clay material to the rotary screen 1. The large stones separated from the clay in the primary screening operation are discharged from one end of the latter, as indicated at 3, while the clay passing through the screen is collected upon a suitable conyever 4 which conducts the clay to a hopper 5, from which it is carried by the bucket elevator 6 to the upper end of an elevated chute 7. In passing down the chute 7, the clay material containing the small stones and solid particles passes over a shaker screen 8, see Fig. 2, which functions in the conventional manner to separate the small stones and solid particles from the major portion of the clay, which passing through the screen into a hopper 9 is discharged through a chute 10 to a suitable point of collection, this clay being of a consistency and freedom from solid particles suitable for manufacture into brick.

The "tailings", consisting of the stones and solid balls of clay which fail to pass through the shaker screen 8, discharge from the lower reversed end 7a of the chute 7 into the path of the blades or paddles of a rotary pulverizer 11, which is mounted as shown in Figs. 1, 3 and 4, in an upper corner of a hopper casing 12. The pulverizer 11 is rotated on its shaft 13 at a rapid rate through the medium in the present instance of an electric motor 14 which is connected to the shaft 13 by a suitable coupling 15. With a blade radius of seven or eight inches, a speed of rotation of, say, 1800 R. P. M. has been found suitable for certain types of clay aggregate, this speed of rotation affording the necessary impact velocity and affording also a sufficiently strong centrifugal action to maintain the blades in clean condition and free from accumulations of adhering clay. It will be understtod, however, that the speed of the blades may be varied as required to give the desired effect under the prevailing conditions. The opposite end of the shaft 13 carries a suitably weighted fly wheel 16. The impact of the blades or paddles of the pulverizer 11 upon the "tailings" passing from the lower end of the chute 7 has a shattering effect, breaking the clay into a state of fine sub-division and impelling the stone and solid particles toward the opposite end of the casing 12 where they enter a sub-hopper 17, from which they are discharged through a chute 18. The finely divided clay separated from the stones and having insufficient momentum to carry it into the sub-hopper 17 falls to the bottom of the hopper 12, from which it is conducted through a chute 19 to the hopper 5 where it is again elevated through the medium of the bucket conveyer 6 to the upper end of the chute 7. In again passing over the shaker screen 8, this finely divided clay material passes through the screen and is discharged through the chute 10 as previously described.

In order to further increase the efficiency of the apparatus, I prefer to employ the baffle plates shown at 20 in Fig. 1. These plates are installed by suitable means in the upper part of the casing 12 at a point adjacent the sub-hopper 17 and in the paths of the particles projected toward the sub-hopper by the blades of the pulverizer 11. They are arranged at an acute angle to the direction of the movement of the particles, and the angle is such that solid particles striking the baffles, while being deflected from their normal courses, still maintain sufficient velocity to pass into the sub-hopper 17. Particles of solid clay, however, or clay masses adhering to stone particles, are reduced by impact with the baffles 20 to the desired finely divided condition, and in that condition lack the momentum required to carry into the sub-hopper. The relative arrangement and number of the baffles is such, preferably, that their collective surfaces embrace substantially the entire effective width of the casing 17 while being sufficiently far apart to avoid choking of the deflected particles between the opposed surfaces of the adjoining baffles, as shown for example in Fig. 5.

By employing the baffles, as described, it is possible to materially increase the effecticve area of the mouth of the sub-hopper 17, or in other words to so position the sub-hopper that it may receive a relatively large proportion of the total material impelled toward it by the pulverizer 11. To so position the mouth of the sub-hopper in the absence of the baffles 20 would result in a too great loss of clay, but the baffles acting as a bar to the clay and permitting the stones to pass, as described, prevents this loss of clay and insures a maximum separation of the stone.

Another structural feature affording an increased efficiency resides in the upward bowing of the top wall of the casing 12 adjacent the pulverizer 11. The abrasive action of the clay aggregate upon the blades of the pulverizer tends to cause a progressive beveling of the forward outer edges of the blades. These bevels have the effect of projecting a portion of the aggregate upwardly on an arc which, if suitable provision were not made, would impinge on the top of the casing and be deflected downwardly into the main hopper, thereby adversely affecting the efficiency of the process. The bowing of the casing as described and illustrated compensates in effect for the deformation of the blades and affords the latter a relatively extended useful life with no decrease in the efficiency of the apparatus as a whole. A substantial economy is thus effected.

I have discovered that by this process the "tailings" are effectively disposed of, with a substantially complete separation of the clay component thereof from the stone or solid particles and the substantial elimination of the latter from the clay mass. The clay as separated from the "tailings" in this manner is in a state of extremely fine subdivision ideally suited to the manufacture of brick, and when added to the clay which originally passes through the shaker screen 8 affords a basic clay material of greatly improved characteristics as compared with that obtained by the conventional processes. As a result, the end product also exhibits a substantial improvement in quality.

The process is characterized by a relatively high efficiency, in that as previously described it disposes effectively of the "tailings" and recovers the substantial clay component of the "tailings" which heretofore constituted a waste material. It will be noted further that the process is conducted solely by screening operations in conjunction with the action of the pulverizer 11, and thereby eliminates the requirement for the expensive grinding machinery heretofore commonly employed in the preparatory treatment of raw clays in the brick industry.

While the invention has been described in its application to the manufacture of brick, it will be apparent that it may in principle be employed in the preparatory treatment or reduction of raw clay materials for other purposes. It will be understood also that the hereindescribed method and apparatus is subject to modification without departure from the invention. With certain characters of raw clay aggregate, for example, it may be possible to dispense with the various screening operations and to obtain a reduced clay mass suitable for the particular use to which it may be put by means alone of the pulverizing mechanism. Or means other than screening may be used to separate the larger stones from the aggregate in preparation for the pulverizing operation. In various ways, the process and apparatus may be modified in view of specific requirements or conditions while still realizing the benefits of the invention as defined in the appended claims.

I claim:

1. The process of preparing raw clay material for manufacture into clay products, which consists in separating from said material the larger stones and foreign substances and breaking down the clay masses, separating the smaller clay-coated stones and solid particles from the broken-down residual material, and recovering the clay component of the "tailings", consisting of said smaller stones and solid particles, by projecting said "tailings" into space by heavy impact, said impact first shattering and reducing the clay to finely divided condition and freeing the clay from the stones, and then separating the stones from the clay by effect of the differing inertias of the stone and finely divided clay particles.

2. The process of preparing raw clay material for manufacture into clay products, which consists in screen said material, and recovering the clay component of the "tailings" from the screening operation, consisting of small clay-coated stones and solid particles by projecting said "tailings" into space by heavy impact, said impact first shattering and reducing the clay to finely divided condition and freeing the clay from stones, and then separating the stones from the clay by effect of the differing inertias of the stone and finely divided clay particles.

3. The process of preparing raw clay material for manufacture into clay products, which comprises as a step thereof projecting said material by heavy impact into space, said impact shattering and reducing the clay component to finely divided condition, and then segregating the clay from the stone content by effect of the differing inertias of the clay and stone components.

HERBERT C. RAFETTO.